United States Patent [19]
Lobato

[11] Patent Number: 4,613,764
[45] Date of Patent: Sep. 23, 1986

[54] RAIN DETECTOR FOR IRRIGATION CONTROL SYSTEM

[75] Inventor: Toribio Q. Lobato, San Dimas, Calif.
[73] Assignee: Clemar Manufacturing Corp., Azusa, Calif.
[21] Appl. No.: 652,179
[22] Filed: Sep. 19, 1984
[51] Int. Cl.[4] .................... H01H 35/18; F24F 11/00
[52] U.S. Cl. .................... 307/116; 307/38; 307/118; 324/61 R; 137/78.2; 137/78.3; 239/63
[58] Field of Search .................. 307/38, 116, 118; 324/61 R; 222/64; 239/63, 64, 65, 67, 68, 69, 70; 137/392, 312, 78.2, 78.3; 73/308, 314, DIG. 8, 304 R, 304 C, 313

[56] References Cited
U.S. PATENT DOCUMENTS

| | | | |
|---|---|---|---|
| 2,611,643 | 9/1952 | Higgins | 239/63 X |
| 3,195,816 | 7/1965 | Mercer | 324/61 R X |
| 3,224,676 | 12/1965 | Rauchwerger | 137/78.2 |
| 3,438,518 | 4/1969 | Aerts | 137/392 X |
| 3,665,209 | 5/1972 | Webb et al. | 324/61 R X |
| 3,721,254 | 3/1973 | Rutten | 137/78.2 |
| 3,750,950 | 8/1973 | Whitener | 239/63 |
| 3,787,728 | 1/1974 | Bayer et al. | 307/141 X |
| 3,894,690 | 7/1975 | Hill | 239/70 X |
| 3,916,926 | 11/1975 | Smolin et al. | 137/392 X |
| 3,944,845 | 3/1976 | Luteran | 73/304 R X |
| 4,014,359 | 3/1977 | Sanner | 307/118 X |
| 4,130,382 | 12/1978 | Bode | 137/78.2 X |
| 4,488,568 | 12/1984 | Hasenbeck | 239/63 X |
| 4,502,288 | 3/1985 | Lynch | 239/63 X |

Primary Examiner—William M. Shoop, Jr.
Assistant Examiner—Shik Luen Paul Ip
Attorney, Agent, or Firm—Kelly, Bauersfeld & Lowry

[57] ABSTRACT

A rain detector is provided for preventing operation of an irrigation system upon detection of an adjustably selected amount of rainfall. The rain detector is designed for use with an automatic irrigation control system of the type including a clock controller to electrically operate one or more normally closed valves for programmed supply of irrigation water to sprinklers individually or in selected groups. The rain detector comprises a switching circuit connected electrically in series with the sprinkler valves, with the switching circuit including spaced sensors extending for an adjustable depth into a collection tray exposed to rainfall. The switching circuit is normally closed in the absence of rainfall to permit normal programmed operation of the sprinkler valves. However, when rainfall within the collection tray reaches a level bridging the sensors, the switching circuit is triggered to form an effective open circuit condition between the clock controller and the sprinkler valves, thereby closing the sprinkler valves pending evaporation of the rainwater to a level below the sensors.

21 Claims, 9 Drawing Figures

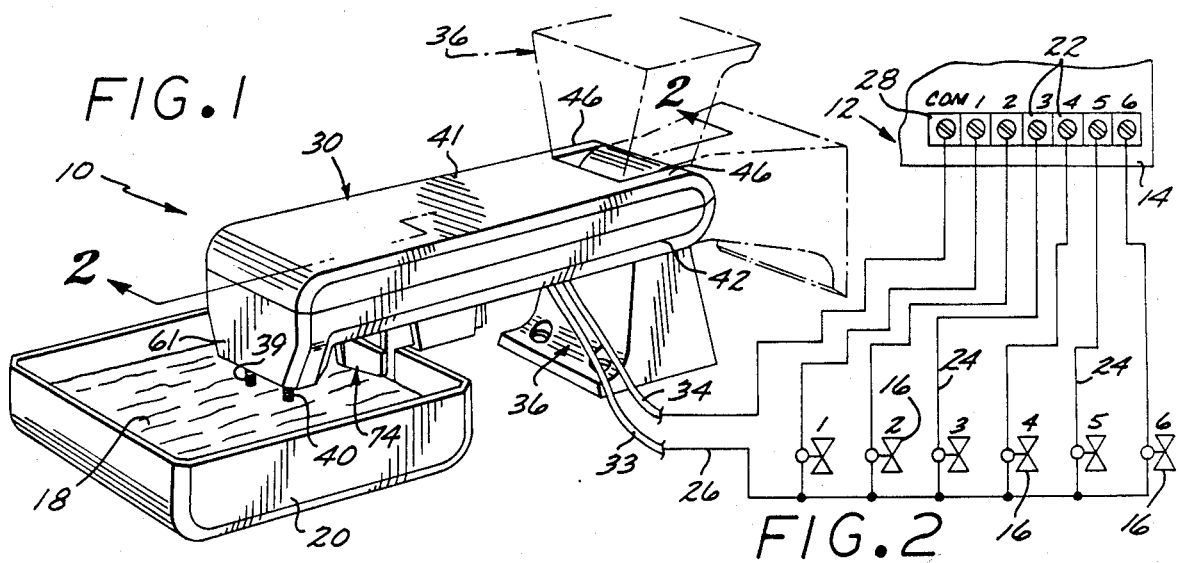
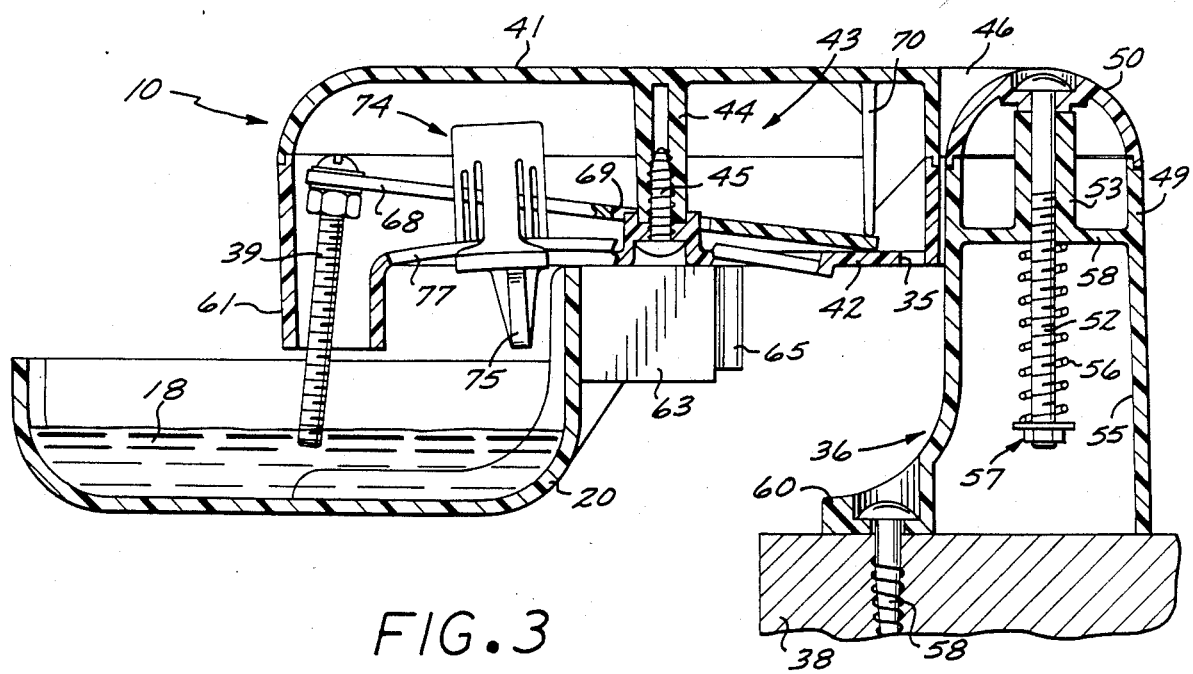
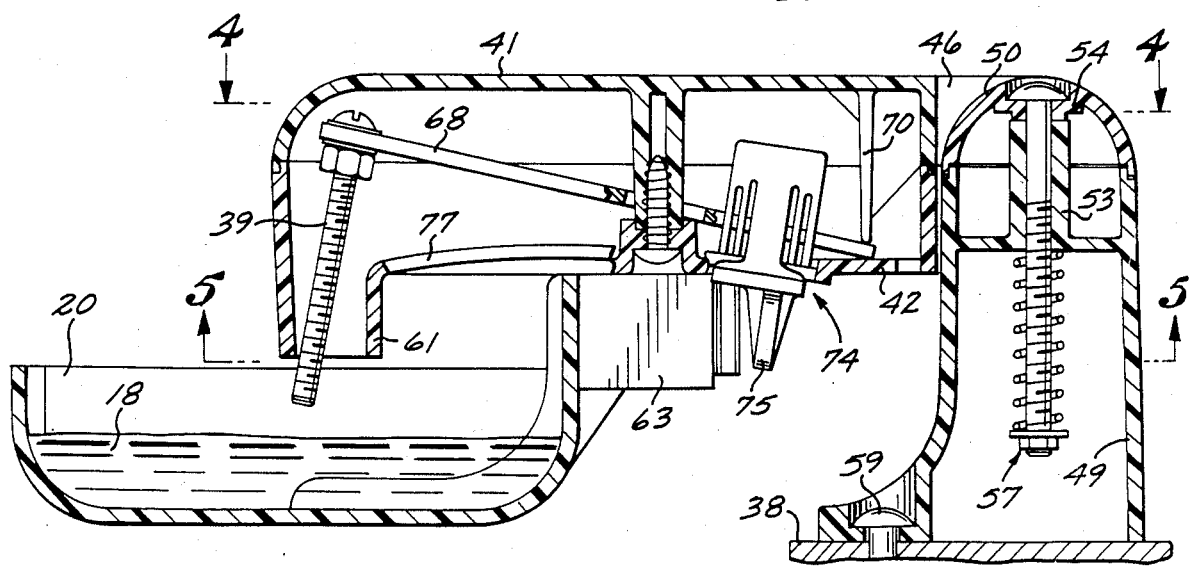

RAIN DETECTOR FOR IRRIGATION CONTROL SYSTEM

BACKGROUND OF THE INVENTION

This invention relates generally to improvements in irrigation control systems particularly of the type for automatic supply of irrigation water to sprinklers at preselected start times and for watering cycles of programmed duration. More specifically, this invention relates to a relatively simple rain detection device for preventing or halting supply of irrigation water to sprinklers in the presence of a predetermined amount of rainfall.

Automatic irrigation control systems in general are well known and commonly include a preprogrammed timer or clock controller for electrically operating a plurality of sprinkler valves, each of which in turn controls supply of irrigation water to one or more irrigation sprinklers. Each sprinkler valve typically includes an electrically operated valve actuator, such as a solenoid actuator, which is normally closed to prevent supply of irrigation water to its associated sprinklers. However, upon receipt of an appropriate actuation signal from the clock controller, the valve actuator is displaced to an open position, thereby initiating water supply to the associated sprinklers in accordance with controller-programmed start times and watering cycle durations. Such automatic irrigation control systems are highly advantageous in that watering cycles can be started and stopped without operator attention. Moreover, such automatic systems insure regular supply of irrigation water in accurate quantities without risk of overwatering and attendant water waste.

Automatic irrigation control systems of the type described, however, are designed to continue programmed watering cycles, irrespective of natural rainfall. Accordingly, such control systems may supply irrigation water to vegetation during or immediately subsequent to a substantial rainfall, resulting in water waste and potentially harmful overwatering of the vegetation. In existing automatic control systems, to prevent continued operation when a significant rainfall has occurred, it has been necessary to manually interrupt the control system, for example, by interrupting timer components for the controller. Such manual interruption, of course, requires operator presence and operator attention and further requires subsequent manual resetting of the system for resumed operation when desired.

There exists, therefore, a significant need for an improved automatic irrigation control system including means for automatically interrupting system operation upon detection of significant rainfall and for automatically resuming system operation at a later time in accordance with the amount of rainfall received. The present invention fulfills these needs and provides further related advantages.

SUMMARY OF THE INVENTION

In accordance with the invention, a rain detector is provided for use with an automatic irrigation sprinkler control system for interrupting system operation upon detection of a selected quantity of rainfall and for maintaining system interruption for a period of time in accordance with the amount of rainfall received. The rain detector includes a moisture-responsive switching circuit connected electrically in series between a clock controller and one or more normally closed, electrically operated sprinkler valves. Conductive sensors forming a portion of the switching circuit protrude into a water collection tray exposed to rainfall. When rainwater within the tray reaches a level bridging the conductive sensors, the switching circuit is triggered to essentially open circuit the sprinkler valves from the clock controller thereby disabling system operation pending evaporation of the collected rainwater to a level below the sensors.

In a preferred form of the invention, the rain detector comprises a compact housing encasing the electrical switching circuit adapted for connection in series between a clock controller and a bank of sprinkler valves by a pair of wires protruding from the detector housing. A swivel mounting base is carried at one end of the housing for convenient mounting onto an appropriate support structure, such as the eaves of a house or other building, at a position remote from system irrigation spray. The rainwater collection tray is removably supported generally below an opposite end of the detector housing in a substantially upwardly open position for collection of rainfall.

The conductive sensors are mounted on a movable support plate disposed within the detector housing, wherein this support plate conveniently comprises a circuit board having the electrical components of the switching circuit mounted thereon. The sensors protrude generally downwardly from the detector housing into the rainwater collection tray. A manually adjusted slide actuator is coupled to the support plate and is manually movable along a guide track formed on the detector housing to selectively adjust the protrusion depth of the spaced sensors into the collection tray.

When the collection tray is dry or the level of rainwater therein is insufficient to bridge the conductive sensors, the switching circuit provides a normally closed circuit path between the clock controller and the sprinkler valves to permit normal programmed operation of the irrigation control system. However, when the water level in the collection tray bridges the sensors, electronic components of the switching circuit are triggered to form an effective open circuit condition between the clock controller and the sprinkler valves, thereby requiring the sprinkler valves to remain or return to the closed positions. This open circuit condition continues until the collected rainwater evaporates to a level insufficient to bridge the conductive sensors, whereupon the switching circuit returns to the normal closed circuit condition permitting resumption of control system operation.

Other features and advantages of the present invention will become more apparent from the following detailed description, taken in conjunction with the accompanying drawing, which illustrate, by way of example, the principles of the invention.

BRIEF DESCRIPTION OF THE DRAWINGS

The accompanying drawings illustrate the invention. In such drawings:

FIG. 1 is a perspective view illustrating a rain detector embodying the novel features of the invention in conjunction with a schematically depicted automatic irrigation control system;

FIG. 2 is a longitudinal vertical sectional view taken generally on the line 2—2 of FIG. 1;

FIG. 3 is a longitudinal vertical sectional view similar to FIG. 2 and illustrating the rain detector in an alternative position of adjustment;

DETAILED DESCRIPTION OF THE PREFERRED EMBODIMENT

Figure 4:
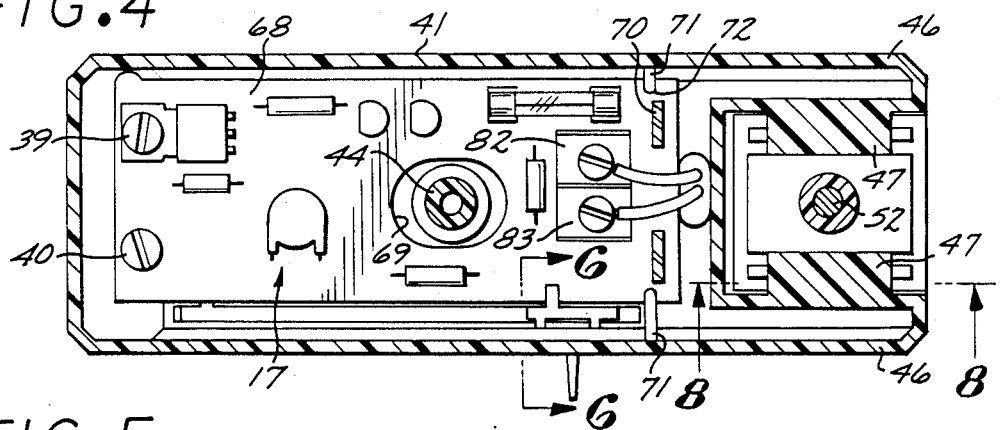
FIG. 4 is a horizontal sectional view taken generally on the line 4—4 of FIG. 3.

As shown in the exemplary drawings, an automated rain detector referred to generally by the reference numeral 10 is provided for controlled rain-responsive disablement of an automatic irrigation control system 12 shown in schematic form in FIG. 1. The rain detector 10 is electrically coupled into the irrigation control system 12 between an automatic controller 14 and one or more electrically operated sprinkler valves 16, and includes a switching circuit 17 (FIG. 9) responsive to the level of rainwater 18 within an upwardly open collection tray 20 to disable the control system 12 as a function of rainfall amount.

The irrigation control system 12 includes conventional system components for automatic supply of irrigation water to sprinklers (not shown) at predetermined start times and for watering cycles of preselected duration. More particularly, as shown schematically in FIG. 1, the control system 12 includes the automatic controller 14 which comprises a timer or clock device of known design for providing valve actuation signals to a plurality of terminal blocks 22 in accordance with a preprogrammed irrigation schedule. These terminal blocks 22, six of which are illustrated in FIG. 1, are individually connected by conductors 24 to a corresponding plurality of the sprinkler valves 16, each of which includes a normally closed and electrically operated valve actuator, such as a conventional solenoid-driven actuator of a type used commonly in irrigation control systems. A ground conductor 26 is connected to the opposite side of the valve actuators 16 and returns to a common ground terminal block 28 on the controller 14. Each sprinkler valve 16 may therefore be opened upon receipt of a programmed actuation signal from the controller 14 to permit supply of irrigation water to one or more associated irrigation sprinklers (not shown) for the duration of the programmed actuation signal, after which the valve returns automatically to the closed position awaiting the next programmed watering cycle.

The rain detector 10 of the present invention is advantageously incorporated into the irrigation control system 12 for preventing opening of the sprinkler valves 16 upon detection of an adjustably selected amount of rainfall. More particularly, the rain detector 10 responds to the presence of rainfall at or above a selected level to electrically disconnect the sprinkler valves 16 from the automatic controller 14 for a period of time correlated with the amount of rainfall actually received. Irrigation water is thus prevented from supply to irrigation sprinklers during a significant rainfall event or within a time period subsequent thereto until the irrigated terrain has at least partially dried and further irrigation is required. Water waste and/or potential vegetation-harming overwatering which might otherwise occur by duplication of natural rainfall are thereby avoided.

The automated rain detector 10 is shown in detail in one exemplary form in FIGS. 1-8 to include a compact detector housing 30 encasing components of an electrical switching circuit 17 which is connected in series with the ground conductor 26 of the control system 12 by a pair of wires 33 and 34 protruding from the housing 30 through a small opening 35. A swivel mounting base 36 is carried at a rear end of the housing 30 for convenient mounting onto a selected support structure 38, and the collection tray 20 is removably supported by the housing in a position underlying the housing front end and substantially upwardly open for collection of rainwater. A pair of spaced parallel conductive sensors 39 and 40 protrude downwardly from the housing 30 partially into the collection tray 20, wherein these sensors are integral portions of the switching circuit 17 for regulating control system operation in response to rainwater levels collected within the tray 20.

More particularly, the detector housing 30 is formed preferably from a lightweight and inexpensive molded plastic or the like to include an upper housing shell 41 shaped to fit matingly with a lower housing shell 42 to define a hollow interior housing chamber 43. In the preferred form, these two shells 41 and 42 cooperatively form a substantially centered mounting stud or post 44 extending vertically through the chamber 43 and into which a connector screw 45 is fastened to connect the shells together. In the embodiment shown in the exemplary drawings, this central post 44 is formed cooperatively by interfitting bosses on the upper and lower shells, and the connector screw 45 has its shank fastened upwardly into the boss on the upper shell 41.

The housing shells 41 and 42 cooperatively form a pair of rearwardly projecting, transversely spaced mounting legs 46 at the rear end of the housing 30 for attachment to the swivel mounting base 36. These mounting legs 46 include at their inboard sides a pair of coaxially aligned and transversely spaced upstanding bearing disks 47 (FIGS. 4 and 8) having transverse serrations formed in their outer diameter surfaces, as shown best in FIGS. 8. These bearing disks 47 are captured between a support block 49 and a collar cap 50 together forming the mounting base 36 and cooperatively defining transversely serrated circular seats for reception about and ratchet-like engagement with the bearing disks 47.

The support block 49 and collar cap 50 are also desirably formed from a lightweight molded plastic or the like and are fastened together by an elongated spring-loaded screw 52. This screw 52 extends through aligned bosses 53 and 54 on the support block 49 and collar cap 50 disposed centrally between the bearing disks 47. The headed end of the screw 52 engages the collar cap 50, whereas the threaded end protrudes into a hollow cavity 55 within the support block 49. A compression spring 56 is carried about the screw and is partially compressed between a nut/washer combination 57 and a platform 58 on the support block 49 to apply a predetermined clamping force to the bearintg disks 47. With this construction, the mounting base 36 may be rotated about the common axis of the disks 47 to any one of a number of positions relative to the detector housing 30, as depicted in FIG. 1, for appropriate orientation and mounting with respect to the support structure 38 by mounting screws 59 fastened into the support structure through an enlarged base flange 60 on the support block 49. In practice, this support structure may comprise any convenient structure, such as a post, the eaves of a building, or the like, for supporting the collection tray 20 for exposure to rainfall but not to irrigation spray from the irrigation system.

Figure 5:
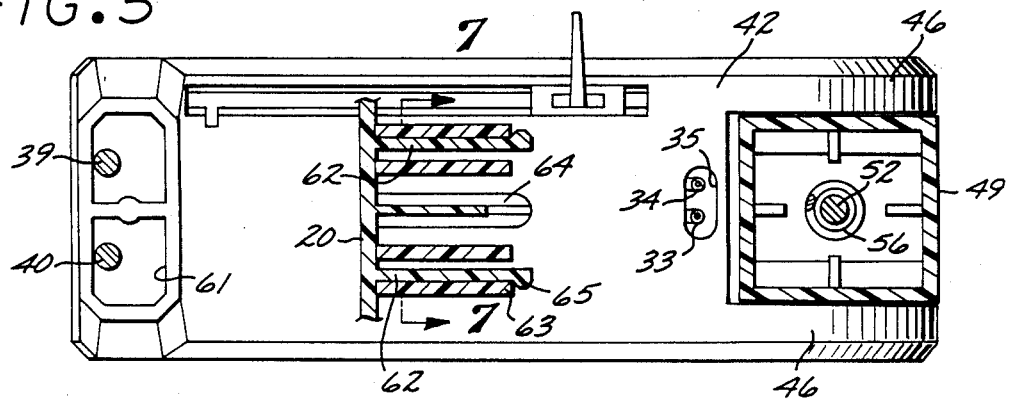
FIG. 5 is another horizontal sectional view taken generally on the line 5—5 of FIG. 3.
Figure 6:
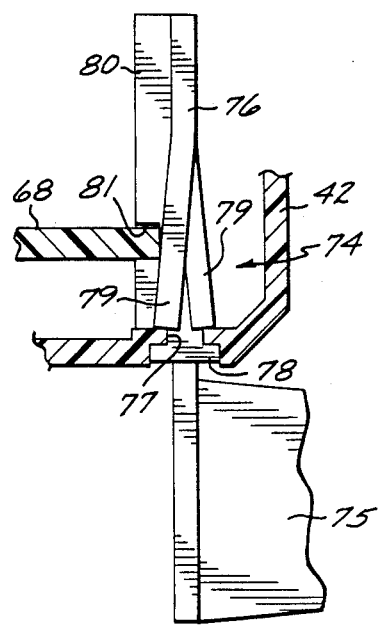
FIG. 6 is an enlarged fragmented vertical sectional view taken generally on the line 6—6 of FIG. 4.
Figure 7:
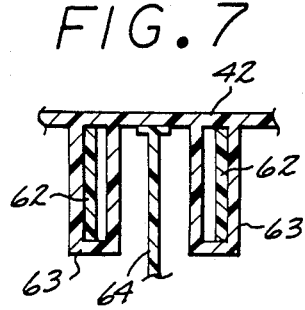
FIG. 7 is a fragmented vertical sectional view taken generally on the line 7—7 of FIG. 5.
Figure 8:
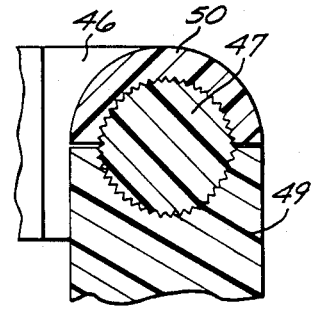
FIG. 8 is a fragmented vertical sectional view taken generally on the line 8—8 of FIG. 4.

At the opposite or forward end of the detector housing 30, the lower housing shell 42 includes a downwardly open nose 61 (FIGS. 2, 3, and 5) through which the conductive sensors 39 and 40 protrude into the underlying rainwater collection tray 20. This collection tray 20 is also formed preferably from a lightweight molded plastic or the like to have a length and width sufficient for substantial upward exposure to rainfall, and a depth sufficient to accommodate a relatively heavy rainfall without overflowing, such as about three-quarters to one inch. The tray 20 is removably suspended from the detector housing 30 in a manner fixing the elevation of the tray relative to the adjustably set elevation of the conductive sensors 30 and 40, as will be described in more detail, while permitting occasional tray removal to facilitate emptying of unwanted debris, such as leaves, bugs, and the like. In the illustrative drawings, this removable mounting is achieved by means of rearwardly directed spaced arms 62 formed integrally with the tray 20 for interlocking reception into longitudinally open sockets 63 depending from the lower shell 42 at positions spaced rearwardly from the open nose 61. These arms 63 desirably include enlarged beads 65 at their rearmost ends for a snap-fit reception behind the sockets 63, as shown in FIGS. 5 and 7. A central support platform 64 also desirably protrudes rearwardly from the tray 20 between the arms 63 for bearing engagement against the underside of the lower shell 42 to retain the tray 20 in the desired orientation generally parallel with the housing 30.

The two conductive sensors 39 and 40 conveniently comprise elongated screws of a selected conductive metal secured to the front end of a lightweight support plate 68 within the housing chamber 43. This support plate 68 is movably carried within the housing chamber 43 to permit vertical adjustment of the plate forward end, as viewed by comparison of FIGS. 2 and 3, to controllably select the depth of extension of the sensors into the underlying collection tray 20. Conveniently, this support plate 68 comprises a circuit board and thereby doubles as a mounting structure for the various components of the electrical switching circuit 17, as viewed in FIG. 4.

In the preferred form, the support plate 68 includes an enlarged central opening 69 for passage of the central post 44 within the housing chamber 43. In addition, a rear end of the support plate 68 is held closely adjacent the interior surface of the housing shell 42 by a pair of retainer legs 70 formed on the upper shell 41. Lateral and fore-aft motion of the support plate 68 are prevented by retainer feet 71 projecting inwardly from the lower shell 42 for reception into transversely open notches 72 at the sides of the plate 68. Accordingly, the rear end of the support plate 68 is relatively loosely but nevertheless generally retained in position to accommodate vertical pivoting motion of the plate generally about said rear end to adjust the elevational position of the plate front end and the conductive sensors 39 and 40.

Pivoting movement of the support plate 68 within the housing 30 is accomplished quickly and easily from the housing exterior by a slide actuator 74 having an easily grasped, outwardly projecting wing 75. More particularly, as shown best in FIGS. 2-6, this slide actuator comprises a platelike slide body 76 which fits through a longitudinally elongated slot 77 in the lower shell 42 along one lateral side margin of the support plate 68. A lower rib 78 (FIG. 6) and transversely bent upper fingers 79 lock the slide body 76 for movement along the vertically curved edges of the slot 77 which define a guide track for slide actuator movement. A vertical rib 80 protrudes from the slide body 36 toward the support plate 68 and includes an intermediate gap 81 for reception of the marginal edge of the support plate 68. Accordingly, sliding movement of the actuator 74 in a fore-aft direction along the guide track functions to raise or lower the front end of the support plate 68 within the housing 30, thereby correspondingly raising or lowering the vertical positions of the sensors 39 and 40. In one working example of the invention, the guide track was shaped to adjust the elevations of the sensors 39 and 40 for initial bridging by collected rainwater with a rainfall range of about 0.05 to about 0.1 inch.

The conductive sensors 39 and 40 form integral portions of the electrical switching circuit 17. This switching circuit may take any convenient form for functionally providing a normally closed or low resistance circuit path between the automatic controller 14 and the bank of sprinkler valves 16 when the collection tray is dry or the water level therein is otherwise insufficient to bridge the two conductive sensors. However, when the water level within the tray rises sufficiently to bridge the sensors 39 and 40, the thus-completed electrical path between the sensors triggers the switching circuit to form an effective open circuit condition between the valve 16 and the controller 14, thereby preventing electrical opening of any one of the sprinkler valves 16.

The duration of system disablement is dependent upon the quantity of rainwater ultimately received in the tray 20, since the open circuit condition is maintained until the collected rainwater evaporates sufficiently to remove the conductive bridge between the sensors. Since this evaporative process of the tray water normally occurs at a rate correlated with and usually slightly faster than the rate of drying of surrounding terrain, the rain detector 10 thus prevents supply of irrigation water during the period when such irrigation water is not required. However, when the conductive bridge between the sensors is removed by sufficient water evaporation, the switching circuit 17 automatically returns to the normally closed circuit condition to permit resumed control by the automatic controller 14. Importantly, throughout the open circuit disablement condition, the controller 14 continues to operate and does not require resetting for resumption of normal operation.

Figure 9:
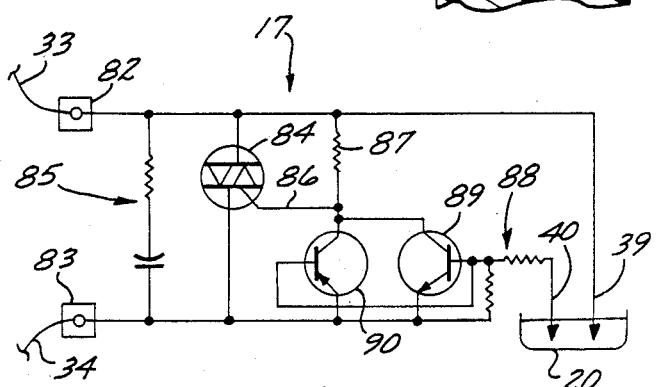
FIG. 9 is a schematic diagram illustrating an exemplary switching circuit for use with the rain detector.

While the specific form and nature of the electronic components for the switching circuit 17 may vary, one exemplary circuit is shown by way of example in FIG. 9. As illustrated, the conductive wires 33 and 34 are electrically connected within the housing to a pair of terminal blocks 82 and 83. When the collection tray 20 is dry, these blocks 82 and 83 are normally connected to one another through an appropriate low resistance switching device, such as a triac 84, with an appropriate gate 86 being coupled to the triac via a current limiting resistor 87. A scrubber circuit 85 is additionally provided to prevent the triac from switching "on" in response to spurious voltage transients in the conventionally used ac power.

When the water level within the collection tray rises sufficiently to bridge the sensors 39 and 40, the electrical power from the terminal block 82 is supplied through the sensors 39 and 40 and a voltage divider 88 to the bases of an NPN and a PNP transistor 89 and 90 which are alternately switched "on" by the ac current. In the "on" state, these transistors 89 and 90 provide conductive ground paths for connecting the triac gate 86 to ground, thereby removing the gate signal from the triac to switch the triac to an "off" condition. Although the transistors 89 and 90 are coupled to ground, the combined resistance of the current limiting resistor 87 and the transistors prevents flow of sufficient current to operate the sprinkler valves 16, thereby effectively providing an open circuit between the sprinkler valve 16 and the controller 14. Likewise, the combined resistance of the water and the voltage divider 88 prevents passage of a current sufficient to operate the valves 16. This open circuit condition is maintained until sufficient evaporation of water within the tray 20 removes the bridge between the sensors and thereby also removes the base signal from the transistors 89 and 90 to return the triac to an "on" condition.

The rain detector 10 of the present invention thus provides a relatively simple yet highly effective device for automatically responding to the presence of rainfall to disable an automatic irrigation control system 12 for a time period correlated with the amount of rainfall received. The minimum rainfall required for detector operation can be adjusted quickly and easily to conform with local irrigation requirements, and the collection tray can be removed quickly and easily for periodic removal of unwanted debris.

A variety of further features and advantages of the rain detector disclosed herein are believed to be apparent to those of ordinary skill in the art. Accordingly, no limitation on the invention is intended by way of the description herein, except as set forth in the appended claims.

What is claimed is:

1. A rain detector responsive to rainfall for preventing operation of an irrigation system having a controller for electrically operating at least one sprinkler valve, said rain detector comprising:
   a detector housing;
   a switching circuit disposed generally within said housing and including means for electrical connection in series with the controller and at least one sprinkler valve, said switching circuit further including a pair of conductive sensors protruding in spaced relation from said housing;
   a support plate movably mounted within said housing and carrying said sensors;
   a rainwater collection tray supported from said housing in a substantially upwardly open position exposed to rainfall, said sensors protruding from said housing downwardly at least partially into said collection tray; and
   means accessable from the exterior of said housing for movably positioning said support plate for adjustably selecting the depth of protrusion of said sensors into said tray for bridging of said sensors by an adjustably selected amount of rainfall collected within said tray;
   said switching circuit including means for providing a normal closed circuit condition between the controller and at least one sprinkler valve when the level of water within said tray in insufficient to bridge said sensors and for providing an effective open circuit condition between the controller and at least one sprinkler valve when the level of water within said tray is insufficient to bridge said sensors.

2. The rain detector of claim 1 wherein said collection tray is removably mounted on said housing.

3. The rain detector of claim 1 wherein said collection tray is removably suspended from said housing, said housing including at least one open socket and said tray including at least one arm for sliding reception into said socket.

4. The rain detector of claim 3 wherein said tray further includes a support platform for engaging the underside of said housing when said arm is received within said socket for maintaining said tray in a predetermined orientation relative to said housing.

5. The rain detector of claim 3 wherein said arm and socket include releasable, interengageable lock means for maintaining said arm within said socket.

6. The rain detector of claim 1 wherein said means accessible from the exterior of said housing comprises a guide track formed on said housing, and a slide actuator movable along said guide track and operably coupled to said support plate for movably positioning said support plate in response to movement along said guide track, said slide actuator being at least partially accessible from the exterior of said housing.

7. The rain detector of claim 1 wherein said support plate comprises a circuit board carrying components of said switching circuit.

8. The rain detector of claim 1 further including a mounting base on said housing for mounting said housing on a selected support structure.

9. The rain detector of claim 8 wherein said mounting base is rotationally mounted onto said housing, said base and housing including interengageable means for normally locking said base against rotation relative to said housing.

10. The rain detector of claim 1 wherein said housing and said tray are formed from a lightweight plastic material.

11. The rain detector of claim 1 wherein the controller includes timing means for providing timed actuation signals to the at least one sprinkler valve which comprises a plurality of sprinkler valves each including a normally closed valve actuator adapted for opening movement in response to receipt of one of the actuation signals.

12. The rain detector of claim 11 wherein the sprinkler valves are electrically coupled to a common ground line, said switching circuit being coupled electrically in series with the common ground line.

13. A rain detector responsive to rainfall for preventing operation of an irrigation system having a controller for electrically operating at least one sprinkler valve, said rain detector comprising:
   a generally hollow detector housing having a sensor opening formed therein and an elongated guide track formed thereon;
   a circuit board supported within said housing for generally pivoting motion about one end of said board to movably position the other board end, said other board end being generally aligned with said sensor opening;

a switching circuit supported generally on said circuit board and including means for electrical connection in series with the controller and at least one sprinkler valve, said switching circuit further including a pair of conductive sensors protruding in spaced relation from said housing through said sensor opening;

a rainwater collection tray removably supported from said housing generally in alignment with said sensor opening for at least partial extension of said sensors into said tray, said tray having a size and shape for substantially open upward exposure to and collection of rainfall;

a mounting base on said housing for mounting said housing with respect to a selected support structure in a position supporting said tray in a substantially upwardly open orientation; and a slide actuator movable along said guide track and operably coupled to said circuit board for movably positioning said circuit board to adjustably select the depth of sensor extension into said tray, said slide actuator being at least partially accessible from the exterior of said housing;

said switching circuit including means for providing a normal closed circuit condition between the controller and at least one sprinkler valve when the level of water within said tray is insufficient to bridge said sensors and for providing an effective open circuit condition between the controller and at least one sprinkler valve when the level of water within said tray is sufficient to bridge said sensors.

14. The rain detector of claim 13 wherein said housing comprises a pair of interfitting housing shells and means for fastening said shells together.

15. The rain detector of claim 14 wherein one of said housing shells includes at least one retainer leg for retaining said one board end generally in contact with an inboard surface of the other housing shell, said board having opposed and transversely open notches formed therein, and said other housing shell including retaining feet engageable with said board notches.

16. The rain detector of claim 15 wherein said shell fastening means includes a central mounting post extending through the interior of said housing, said circuit board having a central opening therein for passage of said mounting post.

17. The rain detector of claim 13 wherein said housing further includes a pair of spaced sockets, and wherein said tray includes a pair of mounting arms for releasable locked reception into said sockets, respectively, to removably support said tray from said housing.

18. The rain detector of claim 13 wherein said sensors comprise a generally parallel pair of screws of a conductive material.

19. The rain detector of claim 13 wherein said mounting base is rotationally mounted onto said housing, said base and housing including interengageable means for normally locking said base against rotation relative to said housing.

20. The rain detector of claim 13 wherein said housing further includes at least one mounting leg carrying a bearing disk having transverse serrations in the outer diameter surface thereof, said mounting base including a pair of mounting base members together defining a generally circular bearing seat having transverse serrations in the inner diameter surface thereof and said base further including means for capturing said bearing disk within said bearing seat with a predetermined clamping force to normally prevent rotation of said mounting base about said bearing disk but to permit such rotation in the presence of a rotational force greater than said clamping force.

21. The rain detector of claim 13 wherein said guide track is formed at least in part by a slot formed in said housing, said slide actuator including a slide body entrapped within said slot for movement therealong, means for slidably engaging one marginal edge of said circuit board, and a manually accessible wing to facilitate manual grasping and movement of said slide actuator.

* * * * *